US012756349B2

(12) United States Patent
Blanco et al.

(10) Patent No.: US 12,756,349 B2
(45) Date of Patent: Oct. 6, 2026

(54) PORTABLE SOLAR POWER DEVICE

(71) Applicant: Ecamsecure, Long Beach, CA (US)

(72) Inventors: Lemuel Blanco, Fountain Valley, CA (US); Jesus Medina, Paramount, CA (US); George Rubio, Fontana, CA (US)

(73) Assignee: Ecamsecure, Long Beach, CA (US)

( * ) Notice: Subject to any disclaimer, the term of this patent is extended or adjusted under 35 U.S.C. 154(b) by 98 days.

(21) Appl. No.: 18/827,726

(22) Filed: Sep. 7, 2024

(65) Prior Publication Data

US 2025/0088133 A1 Mar. 13, 2025

Related U.S. Application Data

(60) Provisional application No. 63/631,750, filed on Apr. 9, 2024, provisional application No. 63/537,430, filed on Sep. 8, 2023.

(51) Int. Cl.
*H02S 10/40* (2014.01)
*H02S 30/20* (2014.01)

(52) U.S. Cl.
CPC .............. *H02S 10/40* (2014.12); *H02S 30/20* (2014.12)

(58) Field of Classification Search
CPC ........... H02S 10/40; H02S 20/30; H02S 20/32
See application file for complete search history.

(56) References Cited

U.S. PATENT DOCUMENTS 5,542,203 A * 8/1996 Luoma .................. G09F 9/3026 340/908
8,654,512 B2 2/2014 Van Straten
8,662,072 B2 3/2014 Butler et al.
8,716,889 B2 5/2014 Vaidyanathan
8,854,794 B2 10/2014 Van Straten
9,046,281 B2 6/2015 Curran
9,324,893 B1 4/2016 Kats et al.
9,428,100 B2 8/2016 Sharpley et al.
(Continued)

FOREIGN PATENT DOCUMENTS

KR 101937348 B1 * 1/2019 .............. B60L 8/006
WO WO-2017165913 A1 * 10/2017 ............. H02S 10/40
(Continued)

OTHER PUBLICATIONS

English machine translation of Lee (KR-101937348-B1) provided by the EPO, All Pages, 2026. (Year: 2026).*

*Primary Examiner* — Daniel P Malley, Jr.
(74) *Attorney, Agent, or Firm* — Cozen O'Connor

(57) ABSTRACT

A device may include a trailer frame with a mast coupled to the trailer frame, the mast including a first sub-mast coupled to the trailer frame and a second sub-mast extendably coupled with the first sub-mast. An electronic device may be mounted at a first device platform coupled to the second sub-mast. A solar panel array may be coupled to a solar-panel-array (SPA) mast, and include a first sub-panel and a second sub-panel, at least one of the first and the second sub-panel being hingedly coupled to the SPA mast. A rotation mechanism may be coupled with the SPA mast including a rotation stop and a rotation limiter. An actuator may pneumatically or electronically controlling the solar panel array between an extended position and a retracted position. The device may further include a display and dynamically changeable content on the display.

18 Claims, 16 Drawing Sheets

(56) References Cited

U.S. PATENT DOCUMENTS

| | | | | |
|---|---|---|---|---|
| 10,236,820 | B2 | 3/2019 | Schmidt | |
| 10,371,328 | B2 | 8/2019 | Poage | |
| 10,374,451 | B2 | 8/2019 | Curlett | |
| 10,778,943 | B2 | 9/2020 | Ellis et al. | |
| 11,177,765 | B1 | 11/2021 | Miller | |
| 11,223,804 | B2 | 1/2022 | Ellis et al. | |
| 11,247,615 | B2 | 2/2022 | Prentice et al. | |
| 11,283,398 | B1 | 3/2022 | Miller | |
| 11,381,201 | B1 | 7/2022 | Miller | |
| 11,569,781 | B2 | 1/2023 | Miller | |
| 11,578,847 | B2 | 2/2023 | Li | |
| 11,662,788 | B1 | 5/2023 | Lindsey | |
| 2009/0165841 | A1 | 7/2009 | Gunn et al. | |
| 2010/0139645 | A1* | 6/2010 | Whipple | H02S 20/32 126/576 |
| 2012/0085387 | A1 | 4/2012 | French | |
| 2016/0186945 | A1* | 6/2016 | Knodel | F21S 9/04 362/485 |
| 2019/0006984 | A1 | 1/2019 | Albertella | |
| 2021/0174714 | A1* | 6/2021 | DeLorean | G08G 1/052 |
| 2022/0109321 | A1 | 4/2022 | Truettner et al. | |
| 2022/0286083 | A1 | 9/2022 | Leuck | |
| 2023/0002248 | A1 | 1/2023 | Mehr | |
| 2023/0005367 | A1 | 1/2023 | Peters | |
| 2023/0010589 | A1 | 1/2023 | Eikelenboom | |
| 2023/0033406 | A1* | 2/2023 | Sayles | H02S 10/40 |
| 2024/0054871 | A1 | 2/2024 | Chun et al. | |
| 2024/0160262 | A1 | 5/2024 | Lindsey | |
| 2025/0175114 | A1* | 5/2025 | Sienkiewicz | F24S 30/455 |

FOREIGN PATENT DOCUMENTS

| | | | |
|---|---|---|---|
| WO | 2021116309 | A1 | 6/2021 |
| WO | 2021119733 | A1 | 6/2021 |
| WO | 2021183532 | A1 | 9/2021 |
| WO | 2022033101 | A1 | 2/2022 |
| WO | 2022063855 | A1 | 3/2022 |
| WO | 2022072155 | A1 | 4/2022 |
| WO | 2022098144 | A1 | 5/2022 |
| WO | 2022150394 | A1 | 7/2022 |

* cited by examiner

PORTABLE SOLAR POWER DEVICE

CROSS-REFERENCE TO RELATED APPLICATIONS

This application claims priority to and benefits from United States Provisional patent application Ser. No. 63/537,430, filed Sep. 8, 2023 and entitled Portable Solar Power Device. This application also claims priority to and benefits from United States Provisional patent application Ser. No. 63/631,750, filed Apr. 9, 2024 and entitled Portable Solar Power Device. Each of the aforementioned applications are incorporated by reference in their entirety as if fully set forth herein.

SUMMARY OF THE EMBODIMENTS

The disclosure generally relates to systems and methods for providing solar power. Specifically, at least some embodiments relate to portable solar power devices that are capable of operating in towable and in-use configurations.

DETAILED DESCRIPTION OF THE EMBODIMENTS

Figure 2:
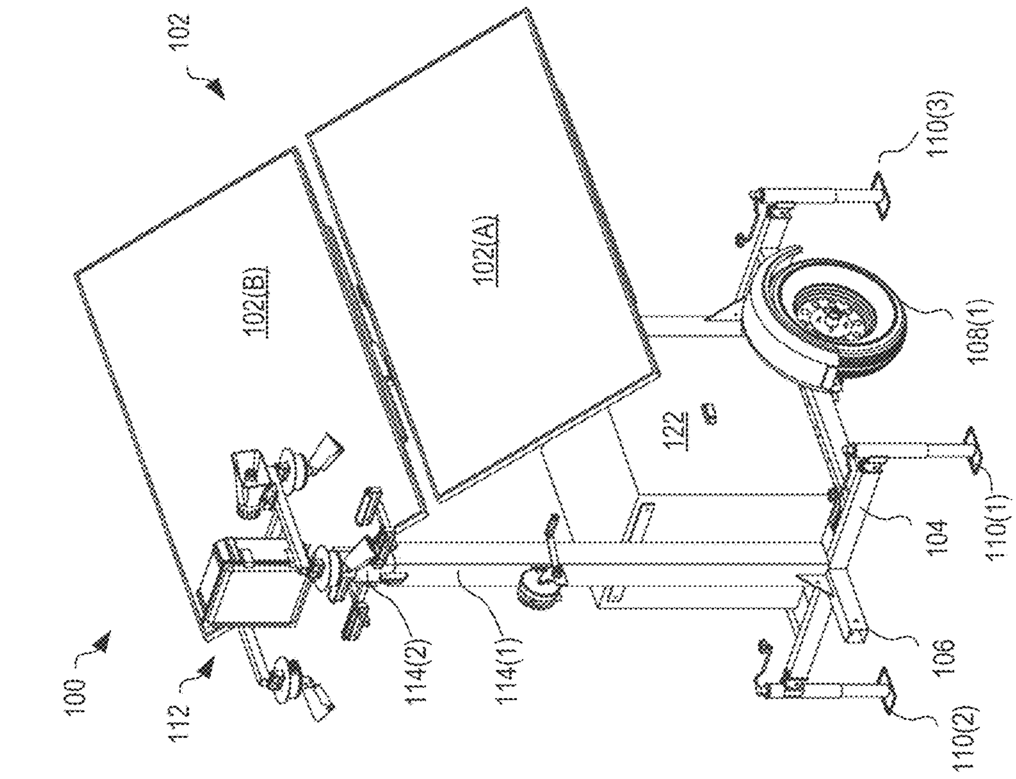
FIG. 2 shows a front perspective view of the portable solar power device with the solar panel array in an extended configuration.
Figure 1:
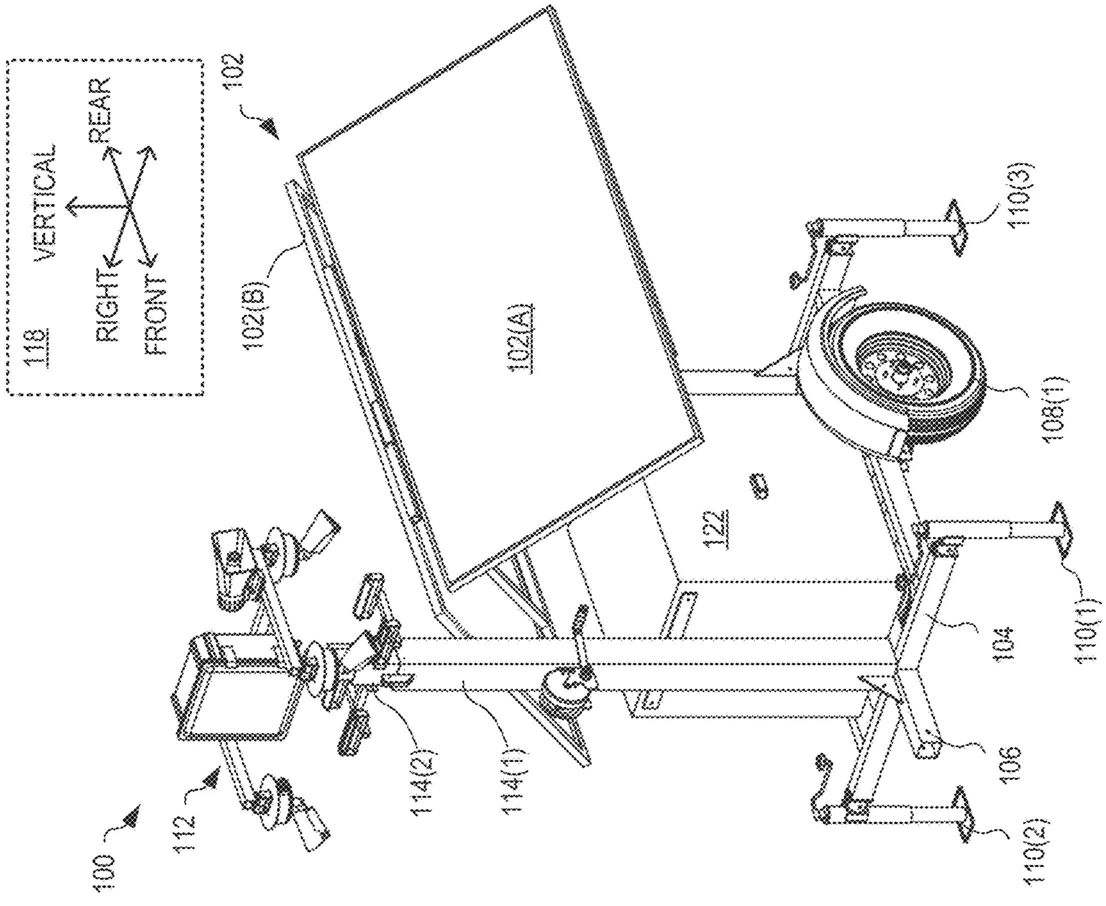
FIG. 1 shows a front perspective view of a portable solar power device with a solar panel array in a retracted configuration, in embodiments.
Figure 4:
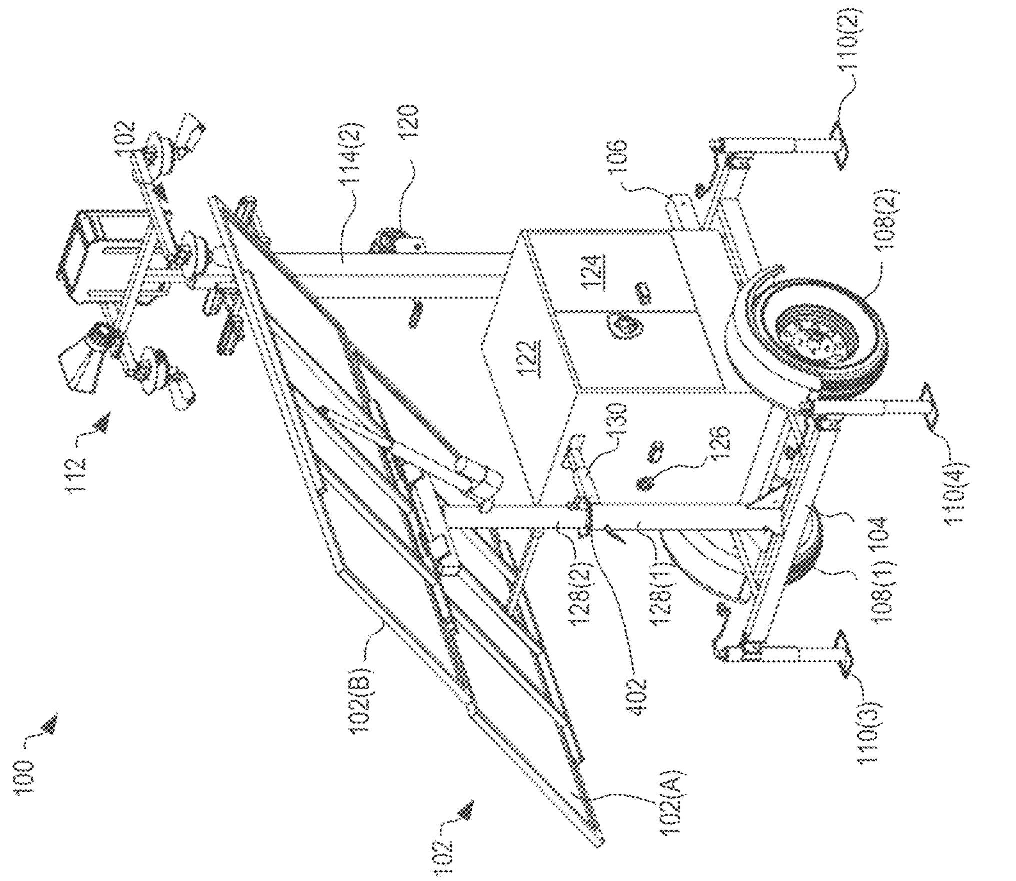
FIG. 4 shows a rear perspective view of the portable solar power device with the solar panel array in the extended configuration.
Figure 3:
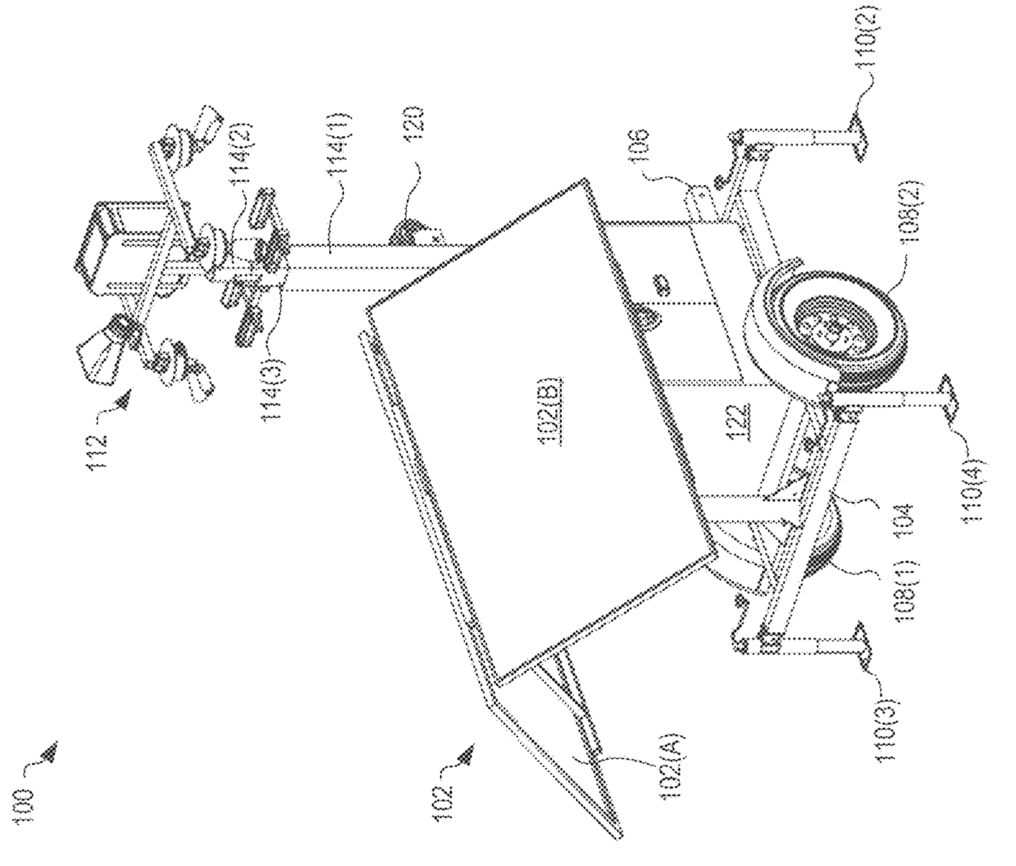
FIG. 3 shows a rear perspective view of the portable solar power device with the solar panel array in the retracted configuration.
Figure 6:
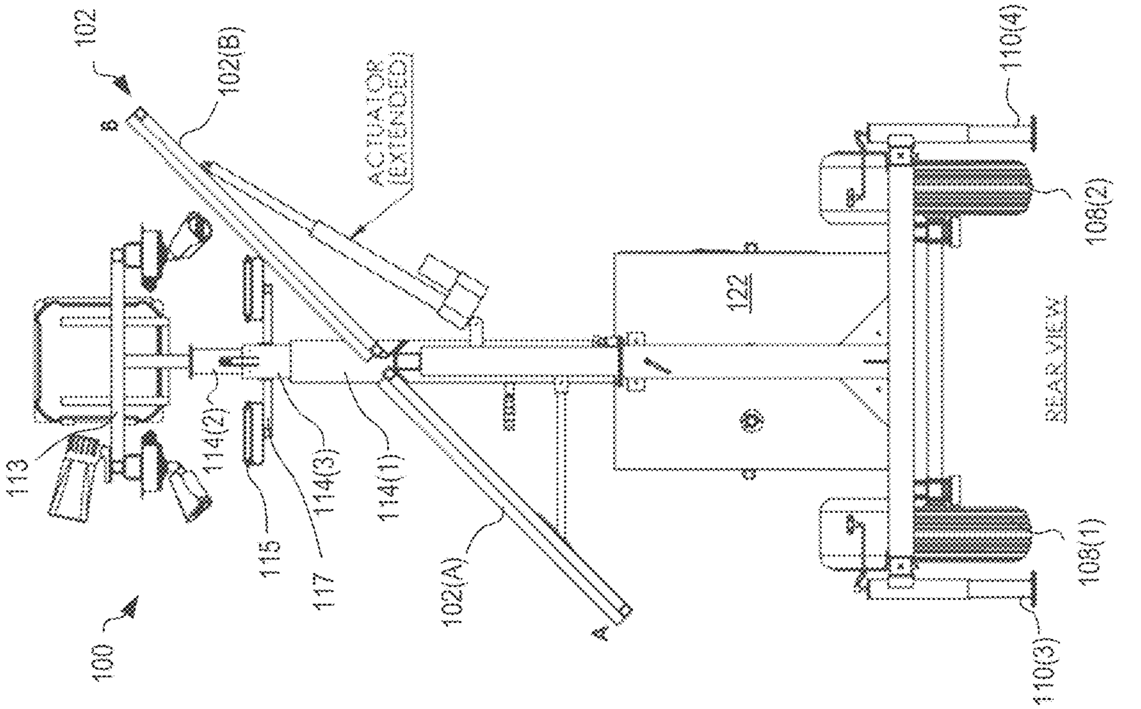
FIG. 6 shows a rear elevation view of the portable solar power device with the solar panel array in the extended configuration.
Figure 5:
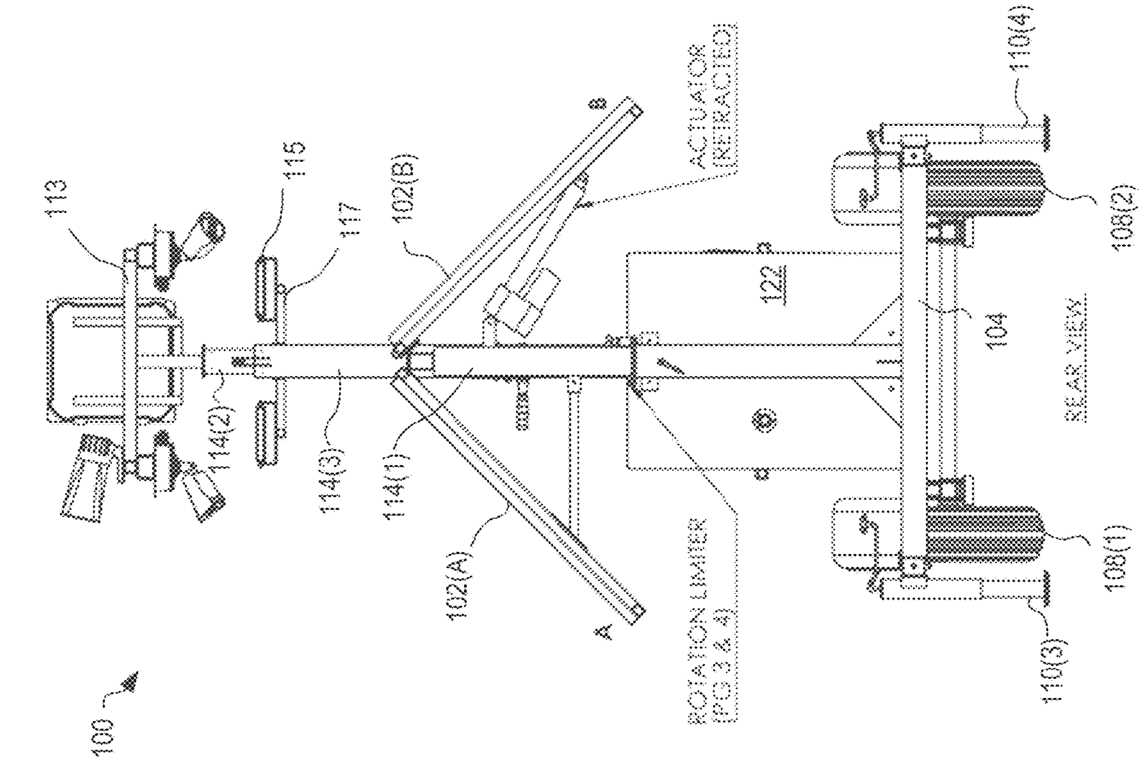
FIG. 5 shows a rear elevation view of the portable solar power device with the solar panel array in the retracted configuration.
Figure 7:
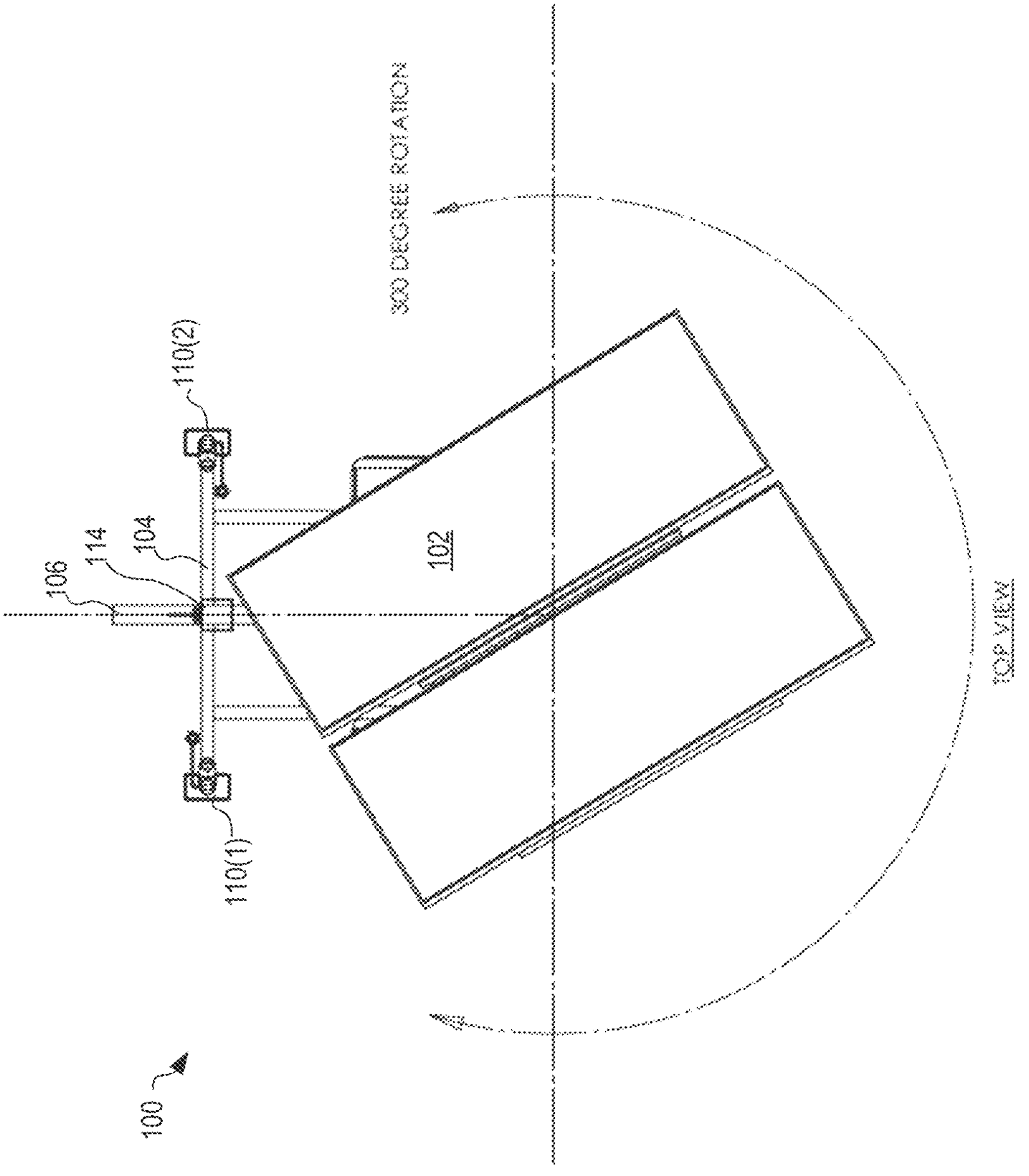
FIG. 7 shows a top plan view of the portable solar power device with the solar panel array in a rotated position.
Figure 9:
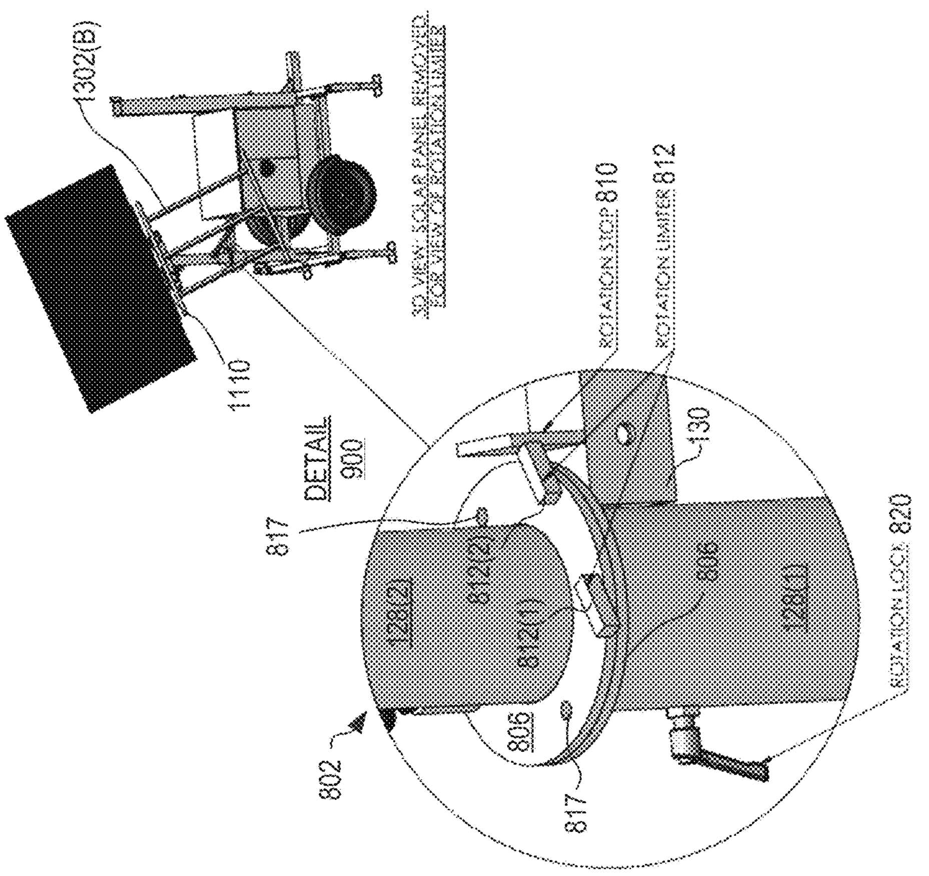
FIG. 9 shows a second detail of a rotation mechanism of the portable solar power device for rotating the solar panel array, in embodiments.
Figure 8:
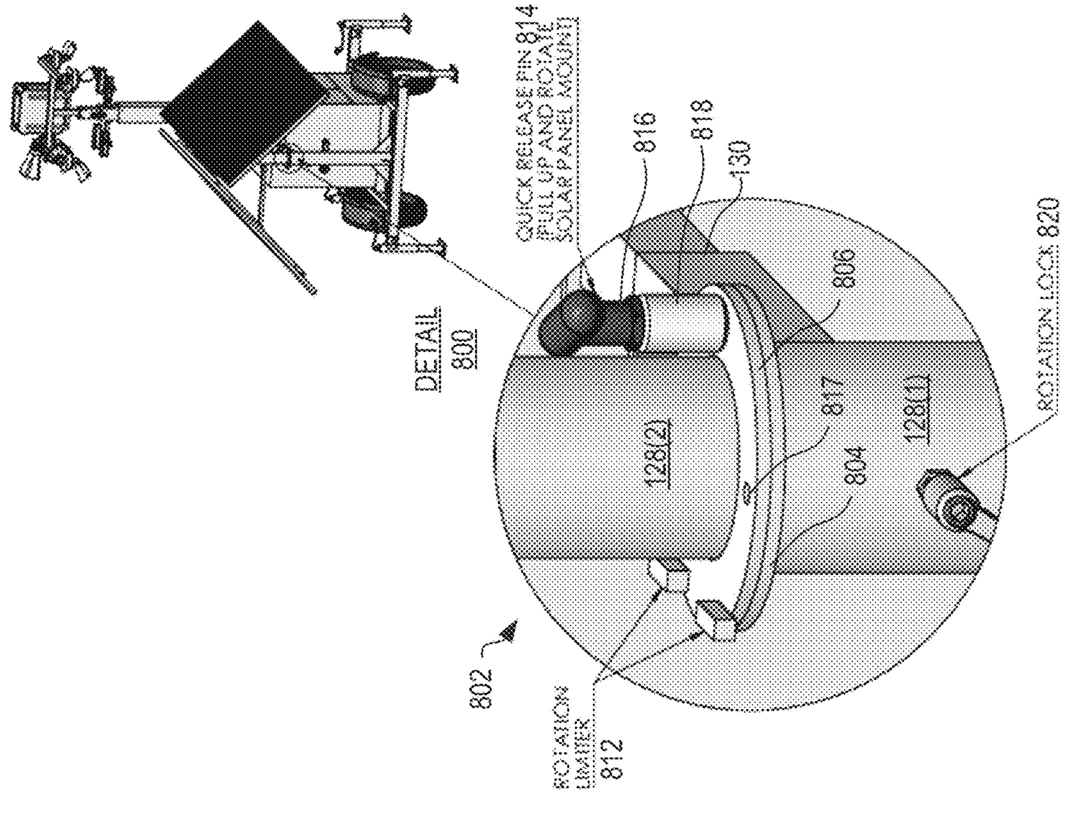
FIG. 8 shows a first detail of a rotation mechanism of the portable solar power device for rotating the solar panel array, in embodiments.
Figure 10:
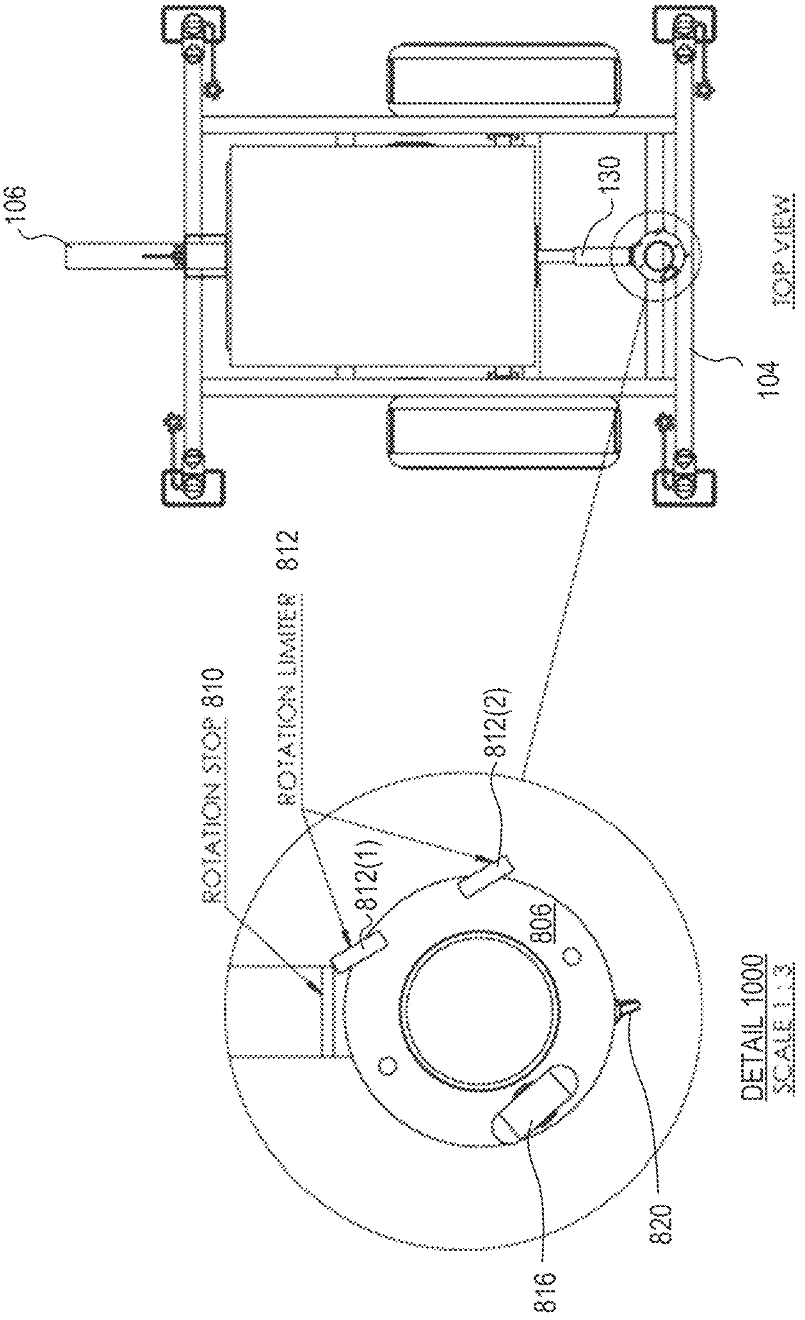
FIG. 10 shows a third detail in top elevation view of the rotation mechanism of the portable solar power device for rotating the solar panel array, in embodiments.
Figure 11:
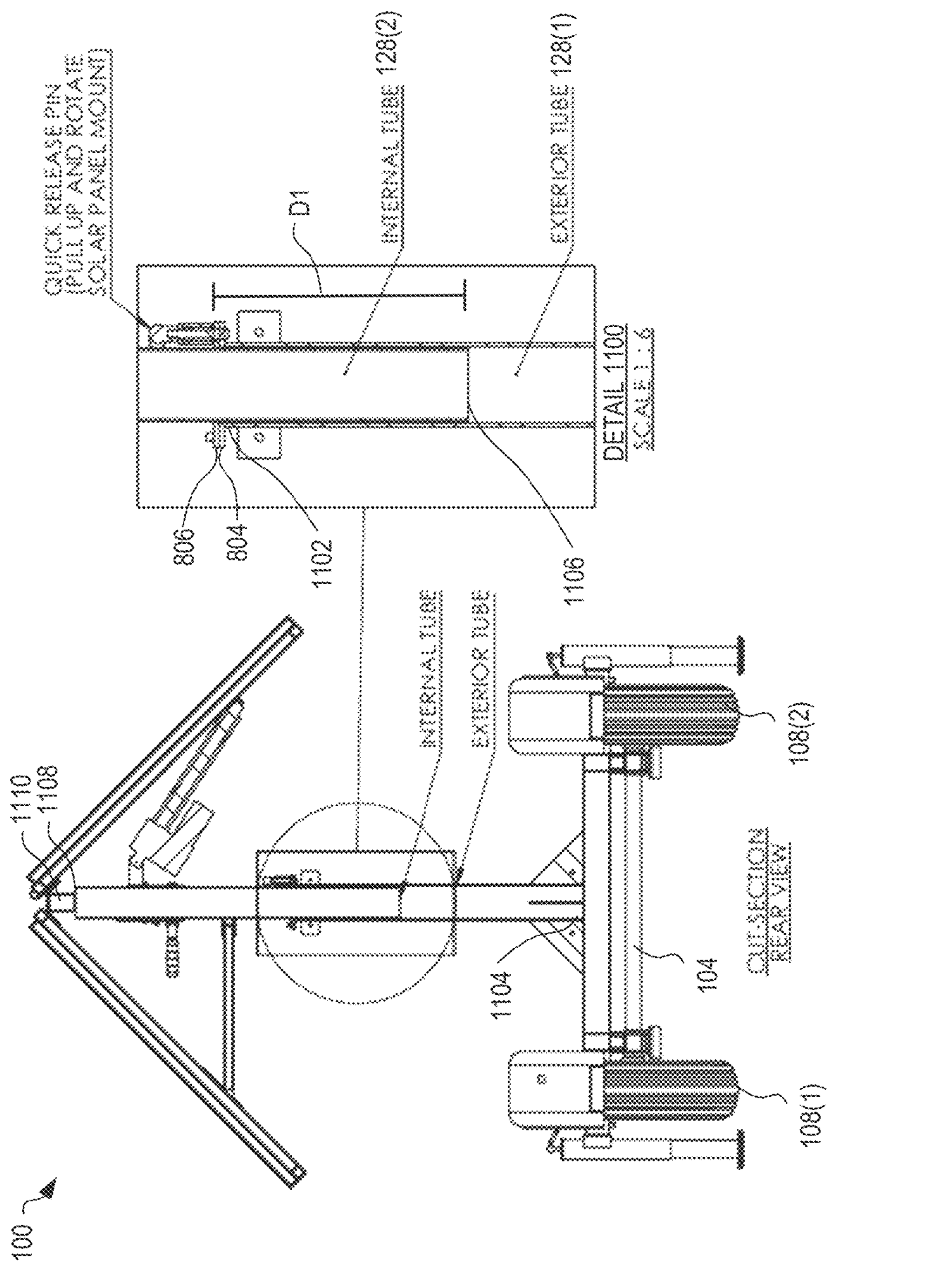
FIG. 11 shows a fourth detail in side cross-section view of the rotation mechanism of the portable solar power device for rotating the solar panel array, in embodiments.
Figure 12:
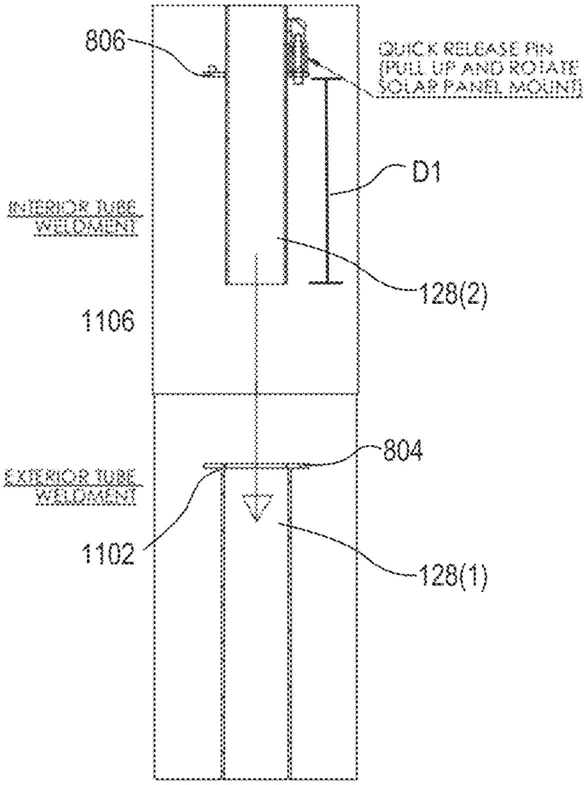
FIG. 12 shows interaction of the second SPA sub-mast inserting within the first SPA sub-mast.
Figure 14:
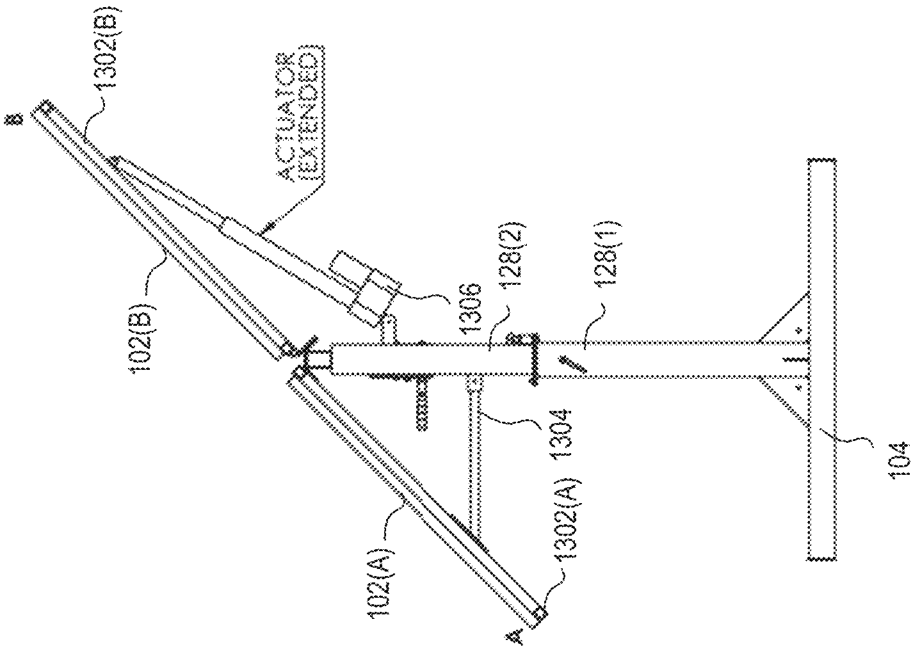
FIGS. 13 and 14 show aspects of an actuator for extending/retracting the solar panel array of the portable solar power device, in embodiments.
Figure 13:
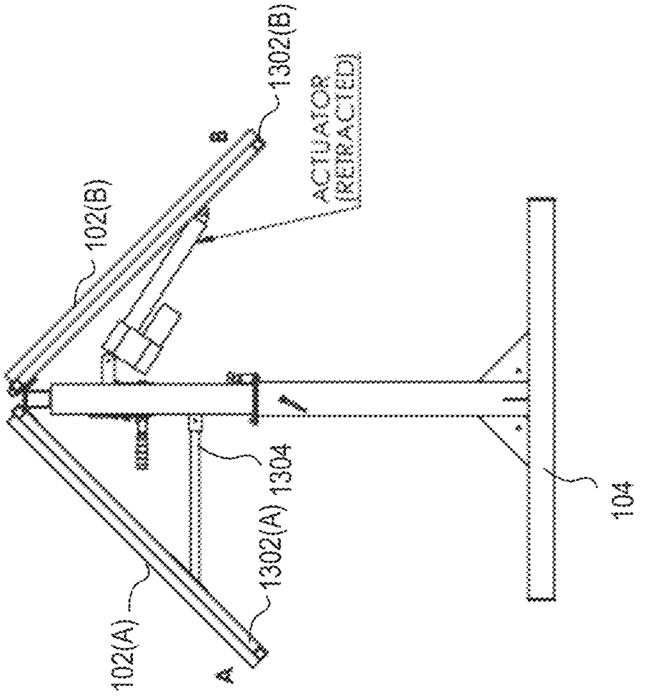

FIG. 1 shows a front perspective view of a portable solar power device 100 with a solar panel array 102 in a retracted configuration, in embodiments. FIG. 2 shows a front perspective view of the portable solar power device 100 with the solar panel array 102 in an extended configuration. FIG. 3 shows a rear perspective view of the portable solar power device 100 with the solar panel array 102 in the retracted configuration. FIG. 4 shows a rear perspective view of the portable solar power device 100 with the solar panel array 102 in the extended configuration. FIG. 5 shows a rear elevation view of the portable solar power device 100 with the solar panel array 102 in the retracted configuration. FIG. 6 shows a rear elevation view of the portable solar power device 100 with the solar panel array 102 in the extended configuration. FIG. 7 shows a top plan view of the portable solar power device 100 with the solar panel array 102 in a rotated position. FIG. 8 shows a first detail 800 of a rotation mechanism of the portable solar power device 100 for rotating the solar panel array 102, in embodiments. FIG. 9 shows a second detail 900 of a rotation mechanism of the portable solar power device 100 for rotating the solar panel array 102, in embodiments. FIG. 10 shows a third detail 1000 in top elevation view of the rotation mechanism of the portable solar power device 100 for rotating the solar panel array 102, in embodiments. FIG. 11 shows a fourth detail 1100 in side cross-section view of the rotation mechanism of the portable solar power device 100 for rotating the solar panel array 102, in embodiments. FIG. 12 shows interaction of the second SPA sub-mast 128(2) inserting within the first SPA sub-mast 128(1). FIGS. 13 and 14 show aspects of an actuator for extending/retracting the solar panel array 102 of the portable solar power device 100, in embodiments. FIGS. 1-14 are best viewed together with the following description.

Portable solar power device 100 includes solar panel array 102 mounted on trailer frame 104. Trailer frame 104 is coupled with a hitching device 106 used to couple the portable solar power device 100 to a vehicle (not shown). In the figures herein, the hitching device 106 does not show the trailer coupler, but those of ordinary skill in the art should understand that any number of standard trailer hitch components may be used without departing from scope hereof.

Trailer frame 104 further supports a plurality of wheels 108 and stabilizers 110. Wheels 108 support towing of portable solar power device 100. Stabilizers 110 operate to stabilize and level the trailer frame 104 when in position for use. Stabilizers 110 are shown with manual cranks, but it should be appreciated that electrical cranks that automatically deploy and level the trailer frame 104 may be implemented without departing from the scope hereof.

Portable solar power device 100 includes an electronic device 112 mounted to trailer frame 104 via a first mast 114 at a first device platform 113. The figures also show a second electronic device 115 mounted to the first mast 114 at a second device platform 117. The second electronic device 115 may be a different type of electronic device than first electronic device 112. For example, the second electronic device 115 may be a lighting system, or a display, such as display 1502 discussed below, or any other electronic device. The second device platform 117 may be located below the first device platform 113 on the first mast 114.

Electronic device 112 may include any single device or a plurality of devices capable of being powered by solar panel array 102 or a battery coupled thereto. Examples of electronic device 112 include but are not limited to wireless gateways, lights (LED lights), cameras, speakers, microphones, display signs, LIDAR sensors, personnel monitors, or other devices. By being mounted on trailer frame 104, portable solar power device 100 provides the advantage of portable deployment of any one or more devices. Moreover, because portable solar power device 100 is powered via solar panel array 102, the devices do not need to be placed near power and are capable of operating without a direct power connection.

Electronic-device (ED) mast 114 is shown having first ED sub-mast 114(1) and second ED sub-mast 114(2). Second ED sub-mast 114(2) is extendable, in a vertical direction as indicated by coordinate system 118, via operation of actuator 120. Actuator 120 is shown as a manual actuator, but it should be appreciated that that electrical cranks that automatically extend first ED sub-mast 114(2) may be implemented without departing from the scope hereof. Moreover, there may be additional ED sub-masts, such as third ED sub-mast 114(3) located between first ED sub-mast 114(1) and second ED sub-mast 114(2). The additional ED sub-masts may also be extendable.

As shown, first device platform 113 is shown coupled to a top edge of the sub-mast 114(2). Second device platform 117 is coupled to the sides of third sub-mast 114(3). Second device platform 117 is coupled in a location of third sub-mast 114(3) that does not interfere with the ability of third sub-mast 114(3) to retract within any portion of first sub-mast 114(1). In other words, a portion of third sub-mast 114(3) is always extending out of firs sub-mast 114(1) even when third sub-mast 114(3) is in a fully retracted state; and the second device platform 117 is mounted at a location of said extending-out portion of third sub-mast 114(3).

Portable solar power device 100 further includes an electronics housing 122. Electronics housing 122 includes a weatherproof (or at least weather resistant) housing that encloses a plurality of electronics components. The electronics components include necessary controller, power supply, wires/cables, displays, input/output devices, etc. necessary to operate electronic device 112. In embodiments, electronics housing 122 houses a portable generator. In embodiments, electronics housing 122 houses a battery that receives power from solar panel array 102. Electronics housing 122 may further include the requisite components for converting power from solar panel array 102 into usable power by electronic device 112, such as but not limited to charge controllers, inverters, cooling fans, transformers, amplifiers, power regulators, etc. Electronics housing 122 is shown with a plurality of access doors 124 (where more or fewer may be included without departing from the scope hereof), and a cable port 126 for receiving cables extending from solar panel array 102 into electronics housing 122.

Solar panel array 102 is supported on trailer frame 104 via solar-panel-array (SPA) mast 128. Solar-panel-array mast 128 includes a first SPA sub-mast 128(1) and second SPA sub-mast 128(2). First SPA sub-mast 128(1) is fixedly mounted to trailer frame 104 such that it does not rotate. As shown in FIG. 4, first SPA sub-mast 128(1) is also secured to electronics housing 122 via support 130. It should be appreciated that first SPA sub-mast 128(1) could be secured to another component of portable solar power device 100, such as first ED mast 114.

As shown in FIG. 11, second SPA sub-mast 128(2) may comprise an inner tube and first SPA sub-mast 128(1) may comprise an exterior tube. Second SPA sub-mast 128(2) is rotatable with respect to first SPA sub-mast 128(1) about a longitudinal axis of the mast 128 as controlled by a rotation mechanism 402. As shown in FIG. 7, rotation mechanism 402 may provide a 300 degree rotation capability of second SPA sub-mast 128(2) with respect to first SPA sub-mast 128(1). Portable solar power device 100 is not limited to 300 degree rotation, it could be a greater or lesser amount of rotation. In at least some embodiments, the rotation amount is equal to or less than 350 degrees. In at least some embodiments, the rotation amount is equal to or less than 340 degrees. In at least some embodiments, the rotation amount is equal to or less than 330 degrees. In at least some embodiments, the rotation amount is equal to or less than 320 degrees. In at least some embodiments, the rotation amount is equal to or less than 310 degrees.

The amount of rotation may be configured based on the size and configuration of solar panel array 102. Were solar panel array 102 enabled to fully rotate 360 degrees, the corner of 102 would potentially hit first mast 114, as shown in FIG. 7. By limiting the amount of rotation using rotation mechanism 402, the present embodiments provide the advantage of enabling an increase in size of the solar panels used within solar panel array 102, while still maintaining some advantage of allowing the solar panel array 102 to rotate in order to face the sun while in use without moving the trailer frame 104.

One embodiment of rotation mechanism 402 is shown as rotation mechanism 802 in detail in FIGS. 8 and 9. It should be appreciated that other rotation mechanisms other than that described below with respect to first flange 804 could be implemented without departing from the scope hereof. For example, electronic or electromechanical rotating mechanisms that rotate second SPA sub-mast 128(2) with respect to first SPA sub-mast 128(1) could be implemented. In such instances, electronics housing 122 may include necessary electronics and control mechanisms, including optional wireless interface for receiving control signals (e.g., angle of rotation, etc.) to control the rotation mechanism. Said wireless interface may be Bluetooth, cellular, or other long or short term wireless protocol known in the market. Instead of wireless control signals, the control signals may be directly input into an input/output system within electronics housing 122. Moreover, although show with respect to mast 128, it should be appreciated that first mast 114 may further include the configuration of mast 128, including the rotation mechanism 402 or rotation mechanism 802 discussed below.

Rotation mechanism 802 includes a first flange 804 fixedly coupled to first SPA sub-mast 128(1). First flange 804 may be welded to, or integral with, first SPA sub-mast 128(1). As shown in FIG. 11, first flange 804 may be located at an upper end 1102 of first SPA sub-mast 128(1), where the upper end 1102 is distal from a lower end 1104 of the first SPA sub-mast 128(1) that is mounted to the trailer frame 104.

Rotation mechanism 802 includes a second flange 806 fixedly coupled to second SPA sub-mast 128(2). Second flange 806 may be welded to, or integral with, second SPA sub-mast 128(2). As shown in FIG. 11, second flange 806 may be located a distance D1 away from a lower end 1106 of second SPA sub-mast 128(2), where the lower end 1106 is distal from an upper end 1108 of the second SPA sub-mast 128(2) that is mounted to a frame 1110 of the solar panel array 102. FIG. 9 also shows aspects of frame 1110, such as support spanning an area of one or more sub panels of solar panel array 102. Distance D1 may be selected such that a desired amount of second SPA sub-mast 128(2) is inserted into the first SPA sub-mast 128(1).

Rotation mechanism 802 includes a rotation stop 810 and at least one rotation limiter 812. Rotation stop 810 is shown mounted to and/or extending from support 130. Rotation stop 810 is configured to interact with rotation limiter 812. At least one rotation limiter 812 is shown having a first rotation limiter 812(1) and a second rotation limiter 812(2). However, it should be appreciated that 812 may be a single piece instead of two pieces. At least one rotation limiter 812 is configured to interact with rotation stop 810 to prevent the rotation of second SPA sub-mast 128(2) with respect to first SPA sub-mast 128(1). As such, the configuration of rotation stop 810 and at least one rotation limiter 812 may define the rotation degrees (such as 300 degrees as shown in FIG. 7. In the specific embodiment of rotation mechanism 802, rotation limiter 812 extends beyond the outer circumference of second flange 806. It should be appreciated that other configurations of rotation stop 810 and at least one rotation limiter 812 are contemplated herein, such as but not limited to a portion of rotation stop 810 extending over the outer circumference of second flange 806.

Rotation mechanism 802 further includes a quick release pin 814. Quick release pin 814 operates to stop rotation of second SPA sub-mast 128(2) with respect to first SPA sub-mast 128(1) within the maximum angle of rotation as defined by the rotation stop 810 and the at least one rotation limiter 812. For example, quick release pin 814 may include a pin, operable via handle 816, that extends through at least one aperture 817 within second flange 806 and first flange 804 such that second SPA sub-mast 128(2) cannot rotate with respect to first SPA sub-mast 128(1) when the pin is located within the corresponding apertures 817 within second flange 806 and first flange 804 (such as when the apertures within second flange 806 and first flange 804 are aligned, and the handle is not pulled upward (or downward if quick release pin 814 is mounted on first flange 804) to pull the pin within quick release pin 814 out of the aperture within first flange 804 (or the aperture within second flange 806 if quick release pin 814 is mounted to the first flange 804). Quick release pin 814 may be secured to the second flange 806 (or first flange 804) via housing 818, and also may be spring biased via a spring located within housing 818 and around the pin of quick release pin 814.

Rotation mechanism 802 may further include a rotation lock 820. Rotation lock 820 operates to prevent rotation of second SPA sub-mast 128(2) with respect to first SPA sub-mast 128(1) even if quick release pin 814 is released (e.g., the handle 816 is pulled to remove pin from the opposing aperture of first flange 804 or second flange 806). Rotation lock 820 may also prevent vertical movement of second SPA sub-mast 128(2) with respect to first SPA sub-mast 128(1). Rotation lock 820 may be a pin that spans through first SPA sub-mast 128(1) (e.g., an aperture defined therethrough), and interacts with the second SPA sub-mast 128(2). The interaction may be a friction fit (e.g., the pin presses against the outer surface of the second SPA sub-mast 128(2)), or may be a locking fit (e.g., the pin locates within an aperture within the second SPA sub-mast 128(2). Rotation lock 820 may be a threaded pin, in embodiments. In alternative embodiments, rotation lock 820 may include a spring-biased pin similar to that discussed above with respect to quick release pin 814.

In at least some embodiments, the length of support 130 may be variable, and lower end 1104 of first SPA sub-mast 128(1) may be hingedly coupled with trailer frame 104 such that the angle of 128 may be varied with respect to trailer frame 104. These embodiments allow for solar panel array 102 to be positioned closer to, or farther from the first mast 114 and/or electronics housing 122.

Mast 128 may additionally be extendable. For example, second SPA sub-mast 128(2) may be extendable with respect to first SPA sub-mast 128(1), such as via an actuator similar to actuator 120 discussed above with respect to first mast 114. In one embodiment, second SPA sub-mast 128(2) is a two-part component, where the bottom of the lower part is coupled to first SPA sub-mast 128(1) similar to the second SPA sub-mast 128(2) shown in the figures, but there is also another sub-mast coupled to the second SPA sub-mast 128(2) that is extendable similar to first ED sub-mast 114(1) and second ED sub-mast 114(2) discussed above. The actuator would be placed between the location of rotation mechanism 402 and the location of fixed support 1304 and/or actuator 1306 discussed below.

The following aspects of solar panel array 102 are discussed with respect to FIGS. 13-14, but apply equally to all other figures herein unless otherwise specified. Solar panel array 102 may include a first sub-panel 102(A) and a second sub-panel 102(B). Each sub-panel 102(A), 102(B), may be mounted to a respective sub-frame 1302(A), 1302(B). One example of each sub-frame 1302(A), 1302(B), is shown in FIG. 9, where the solar panel is not shown (e.g., the "ladder" configuration). One or both of each sub-frame 1302(A), 1302(B) may be coupled to, or a component of, frame 1110. One or both of each sub-frame 1302(A), 1302(B) may be hingedly coupled to, or a component of, frame 1110. In the example herein, sub-frame 1302(A) is fixedly coupled (e.g., non-hingable) via fixed support 1304 and sub-frame 1302 (B) is hingedly coupled via actuator 1306. It should be appreciated that both sub-frames 1302(A) may be hingedly coupled (e.g., fixed support 1304 may be replaced with an actuator similar to or different from actuator 1306).

Actuator 1306 is shown as a hydraulic actuator having a piston coupled to one of the sub-frame 1304(B) and the mast 128 and a controllable fluid source, coupled to the other one of the sub-frame 1304(B) and the mast 128, that causes the piston to extend or retract. The hydraulic actuator may be spring biased as known in the art. Extending the actuator 1306 causes 1304(B) and sub-panel 102(B) of solar panel array 102 to rotate between a retracted position and an extended position. In the retracted position, the sub-panel 102(B) is at an angle with respect to sub-panel 102(A). The retracted position is ideal for use in transporting the portable solar power device 100. In the extended position, the sub-panel 102(B) may be in the same plane (e.g., parallel with) as the sub-panel 102(A). The extended position is ideal for use to collect solar energy from the sun such that both sub-panels 102(A) and 102(B) can be rotated and pointed toward the sun at the same time to maximize energy production using the solar panel array 102.

Support 1304 is coupled between sub-frame 1302(A) and second SPA sub-mast 128(2). Actuator 1306 is coupled between sub-frame 1302(B) and second SPA sub-mast 128 (2). By coupling the support 1304 and the actuator 1306 to the second SPA sub-mast 128(2), the fixed support 1304 and actuator 1306 do not interfere with rotation of the second SPA sub-mast 128(2) with respect to first SPA sub-mast 128(1).

It should be appreciated that the actuator 1306 may be another type of actuator, such as mechanical, electrical, pneumatic, electromechanical or any other type of actuator known in the art. Alternatively, the sub-frame 1304(B) may be extendable or retractable under manual force and held in place via a pin/lock configuration.

Figure 15:
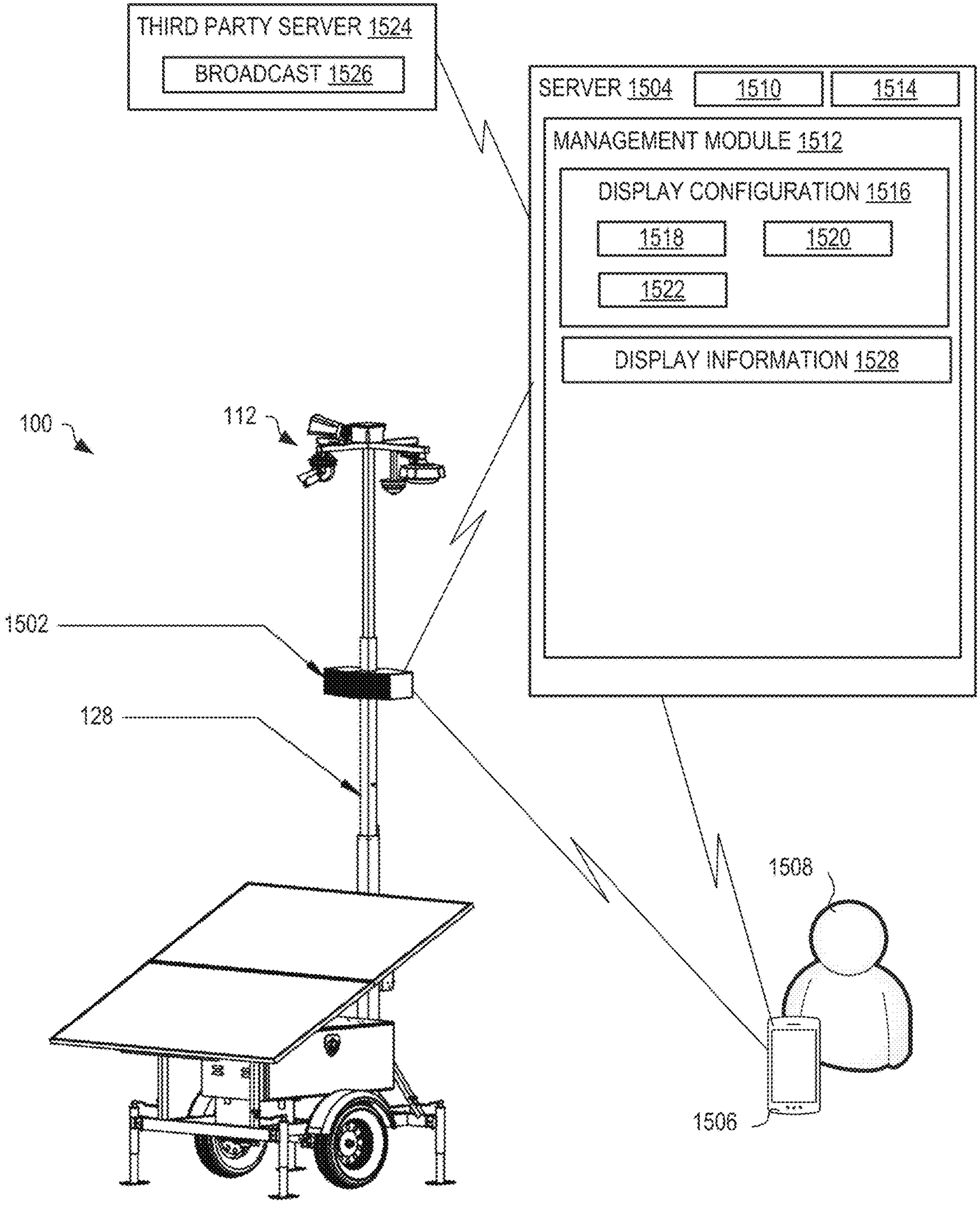
FIG. 15 shows an example of portable solar power device with an additional display, in embodiments.
Figure 16:
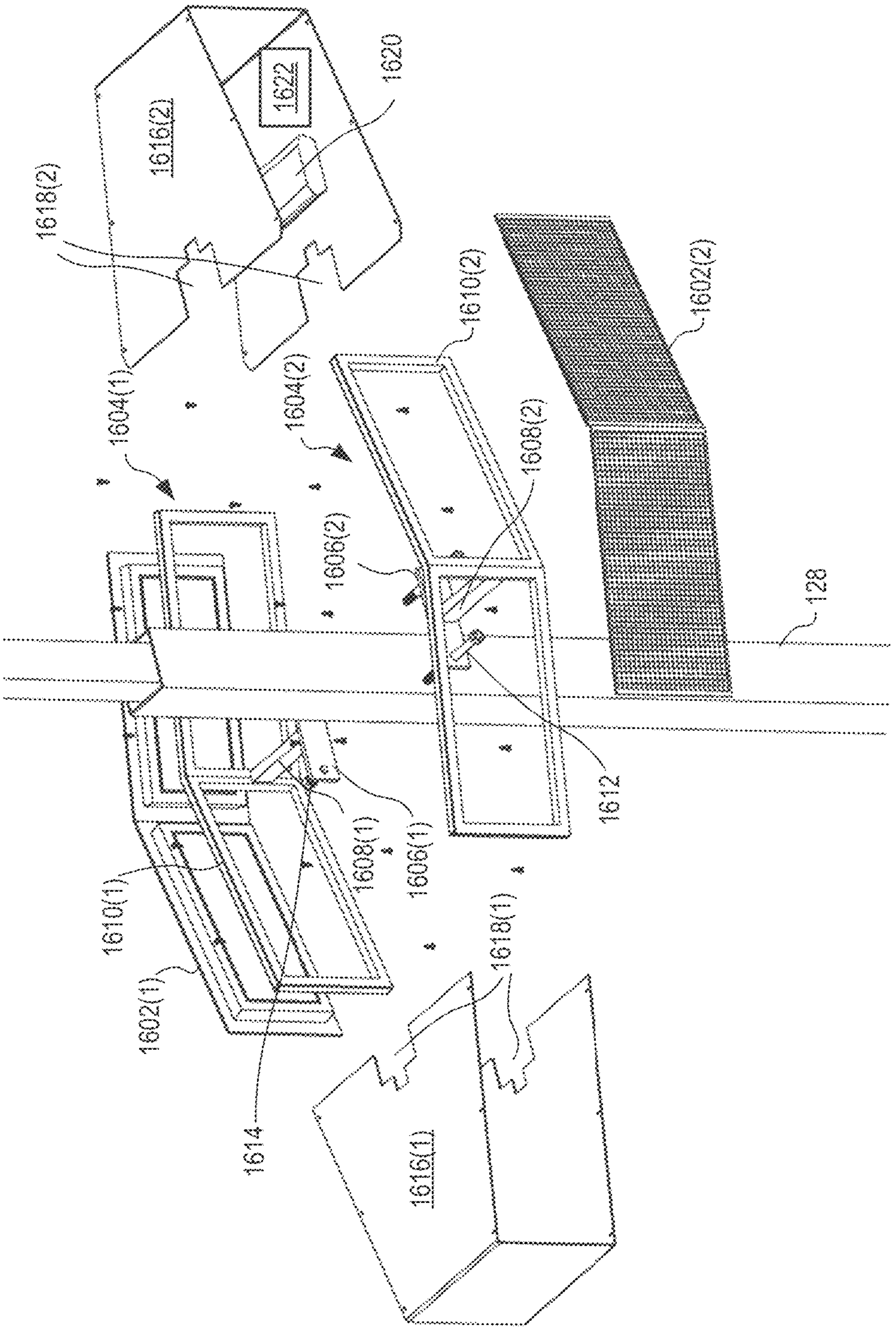
FIG. 16 shows an exploded perspective view of the additional display of FIG. 15.
Figure 17:
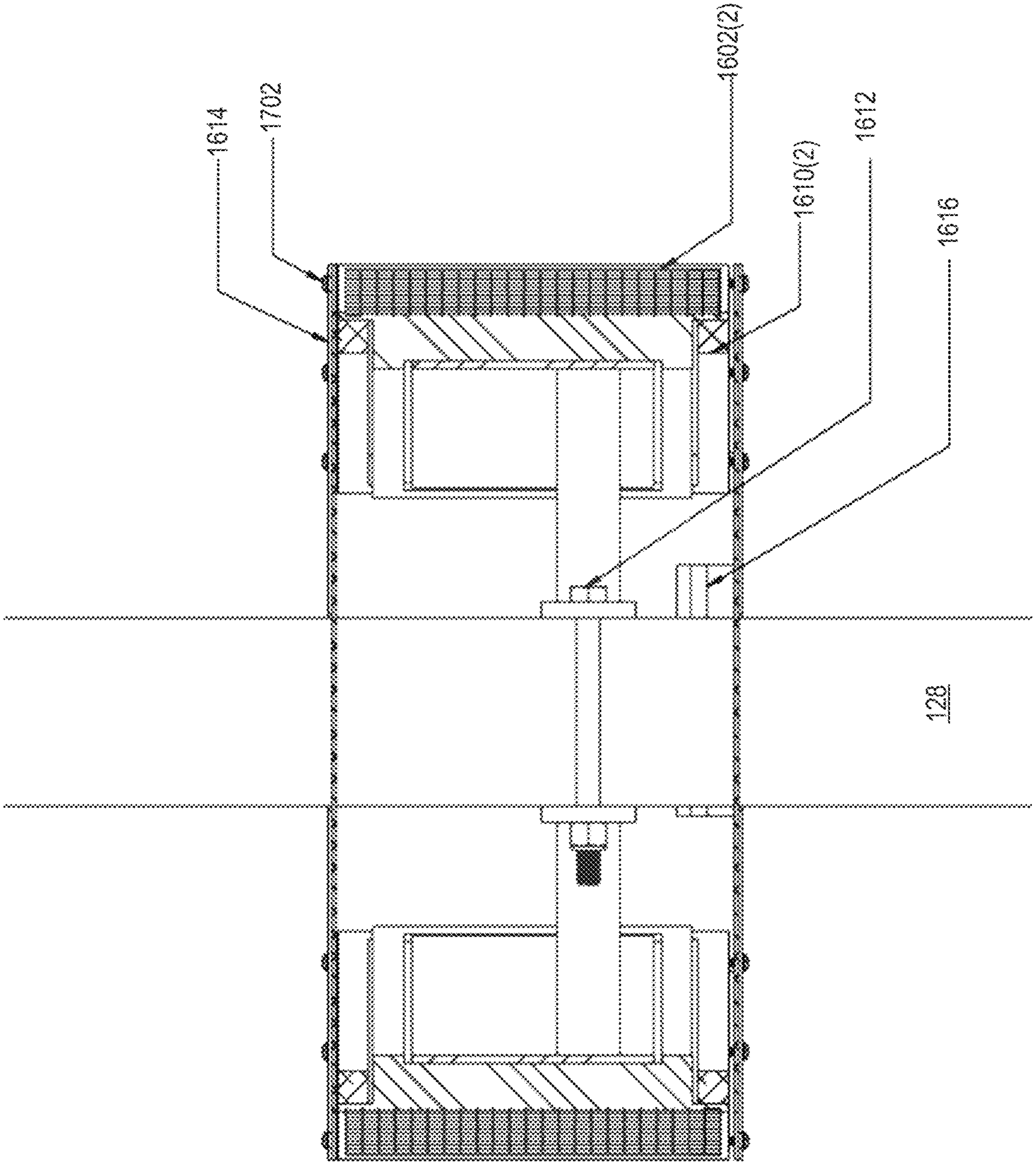
FIG. 17 shows a sectional view of the additional display.

FIG. 15 shows an example of portable solar power device 100 with an additional display 1502, in embodiments. FIG. 16 shows an exploded perspective view of the additional display 1502. FIG. 17 shows a sectional view of the additional display 1502. FIGS. 15-17 are best viewed together with the following description.

Display 1502 may be mounted on any section of mast 128, but it is shown mounted on section 128(2). Display 1502 may be capable of displaying text. In certain embodiments, the text may be synchronized with audio that is emitted by a speaker located on a device platform (such as first device platform 113 or second device platform 117 discussed above). It should be appreciated that, when mounted on a telescoping/extendable section of mast 128, the additional display 1502 is mounted at a location that does not interfere with the telescoping functionality of said section. In other words, additional display 1502 may be mounted on section 128(2) at a location that does not telescope within section 102(1) when mast 128 is retracted.

Additional display 1502 includes a plurality of display panels 1602. Plurality of display panels 1602 may be LED displays, plasma displays, QLED, or other display having sufficient resolution to provide textual or image information to a user in visual proximity thereto. In other words, plurality of display panels 1602 are more than a mere LED or flashing light, but are capable of providing sufficient information to a given user.

As shown in FIG. 16, plurality of display panels 1602 includes a first display panel 1602(1) and a second display panel 1602(2) mounted at an opposite side thereof. Each display panel 1602 is mounted to a respective bracket 1604. Each brackets 1604 are shown with a base 1606, a post component 1608, and a display insert support component 1610. First display panel 1602(1) may actually include two (or more) sub-displays as shown in FIGS. 15-17 that are controlled and coordinated to form a single display face of additional display 1502. Similarly, second display panel 1602(2) may actually include two (or more) sub-displays as shown in FIGS. 15-17 that are controlled and coordinated to form a single display face of additional display 1502. As such, each display insert support component 1610 may include respective insert supports for each sub-display of each display panel 1602.

The first base 1606(1) is configured to secure with the second base 1606(2) around mast 128 (or a section thereof). In FIG. 16, it is seen that two bolts 1612 and respective nuts 1614 (only one of which are labeled for clarity of illustration) couple first base 1606(1) to second base 1606(2). The location of two bolts 1612 and respective nuts 1614 is such that they do not insert within mast 128, thereby allowing for the telescoping functionality of 128 to be unimpacted. As two bolts 1612 and respective nuts 1614 are tightened, a clamping force is effected to secure additional display 1502 to the desired location on mast 128.

A shroud 1616 (or outer housing) then secures over brackets 1604. As shown, shroud 1616 may include first shroud portion 1616(1) and second shroud portion 1616(2) that secure to 1604 via a plurality of screws 1702. Each of first shroud portion 1612(1) and second shroud portion 1616(2) may have a notch 1618(1), 1618(2) that is sized and shaped to surround mast 128 with little clearance (e.g., ⅛ inch or less, but other clearances may be implemented without departing from scope hereof. Each shroud 1616 is shown having a top planar surface, bottom planar surface and side surface spanning the top planar surface and bottom planar surface. It should be appreciated that side planar surface may be replaced with an additional display panel without departing from the scope hereof. Each shroud 1616 is sized and shape to correspond to the profile created by the first bracket 1604(1) and second bracket 1604(2) once brackets 1604 are secured together via bolts 1612 and respective nuts 1614.

To mount additional display 1502 to mast 128, first bracket 1604(1) is secured to second bracket 1604(2) around mast 128 using two bolts 1612 and respective nuts 1614. Display panels 1602 may then be inserted into respective slots within display insert support component 1610 of each respective bracket 1604. The first shroud 1616(1) and second shroud 1616(2) are then secured to each bracket 1604 (1), 1604(2), respectively.

Additional display 1502 may be coupled (e.g., hardwired) to electronic device 112, or other components within electronics housing 122. As such, electronic device 112 and/or electronics housing 122 may include a power supply that provides power to display 1502 and the associated components thereof. Additionally or alternatively, in at least some embodiments, additional display 1502 includes a battery 1620. Battery 1620 may serve as a backup battery to the power supply within electronic device 112, or may be a sole power source of additional display 1502.

Battery 1620 may additionally be coupled to a controller 1622. Controller 1622 may be a component of additional display 1502, or may be a component of electronic device 112 and/or electronics within electronics housing 122 of portable solar power device 100. In other words, additional display 1502 may be a stand-alone device, or may be integrated to incorporate the additional functionality available using the other components of portable solar power device 100.

Figure 19:
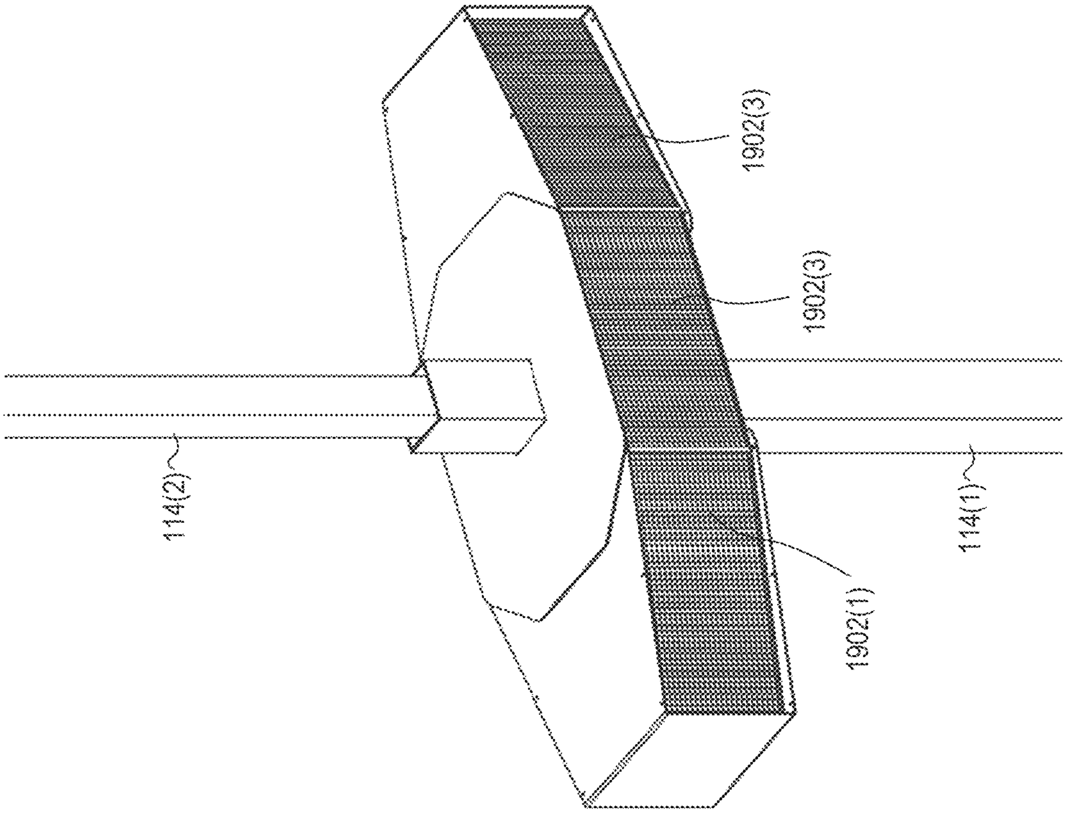
FIGS. 19 and 20 show additional display with three panels, in an embodiment.
Figure 20:
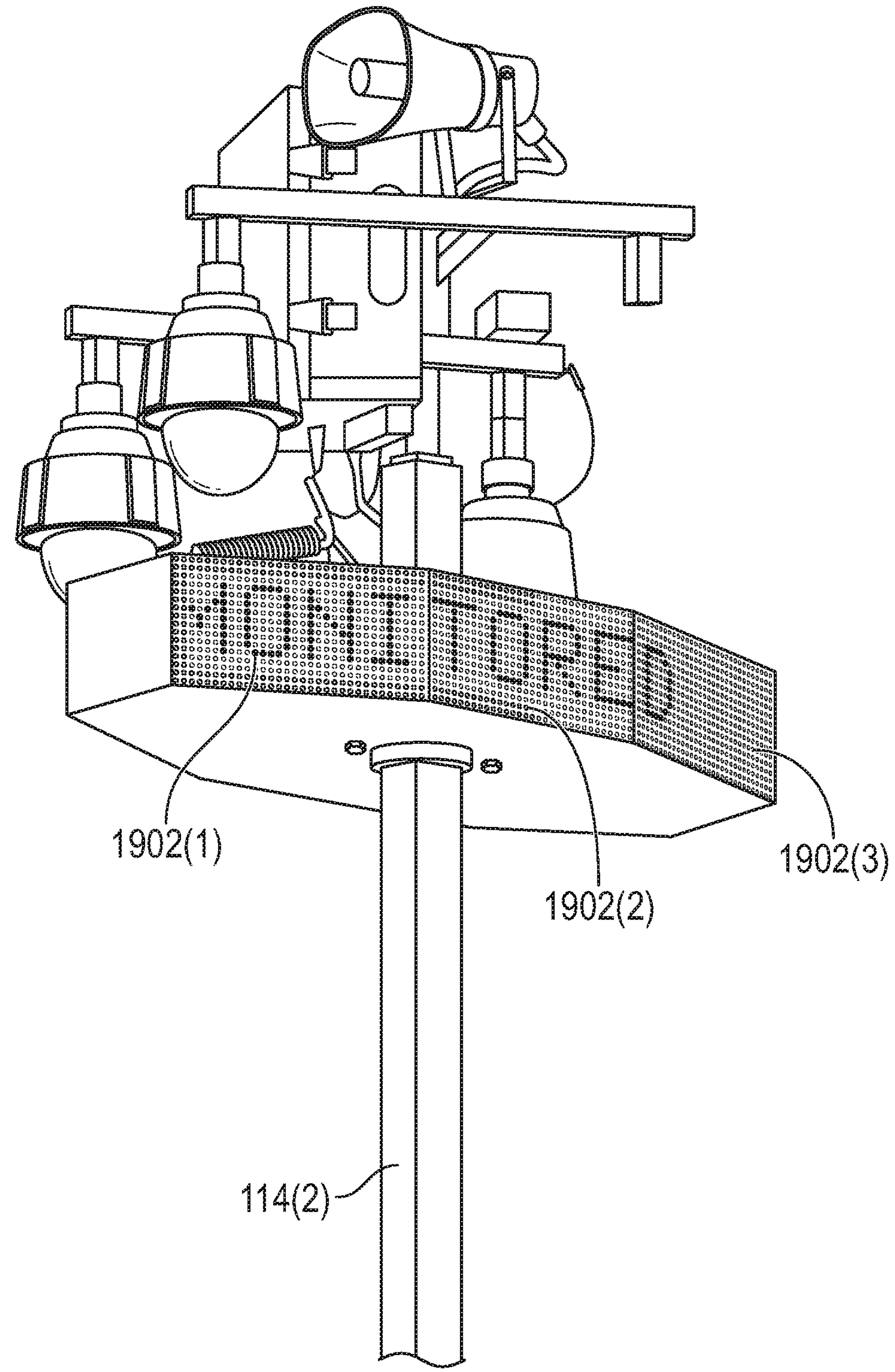
Figure 21:
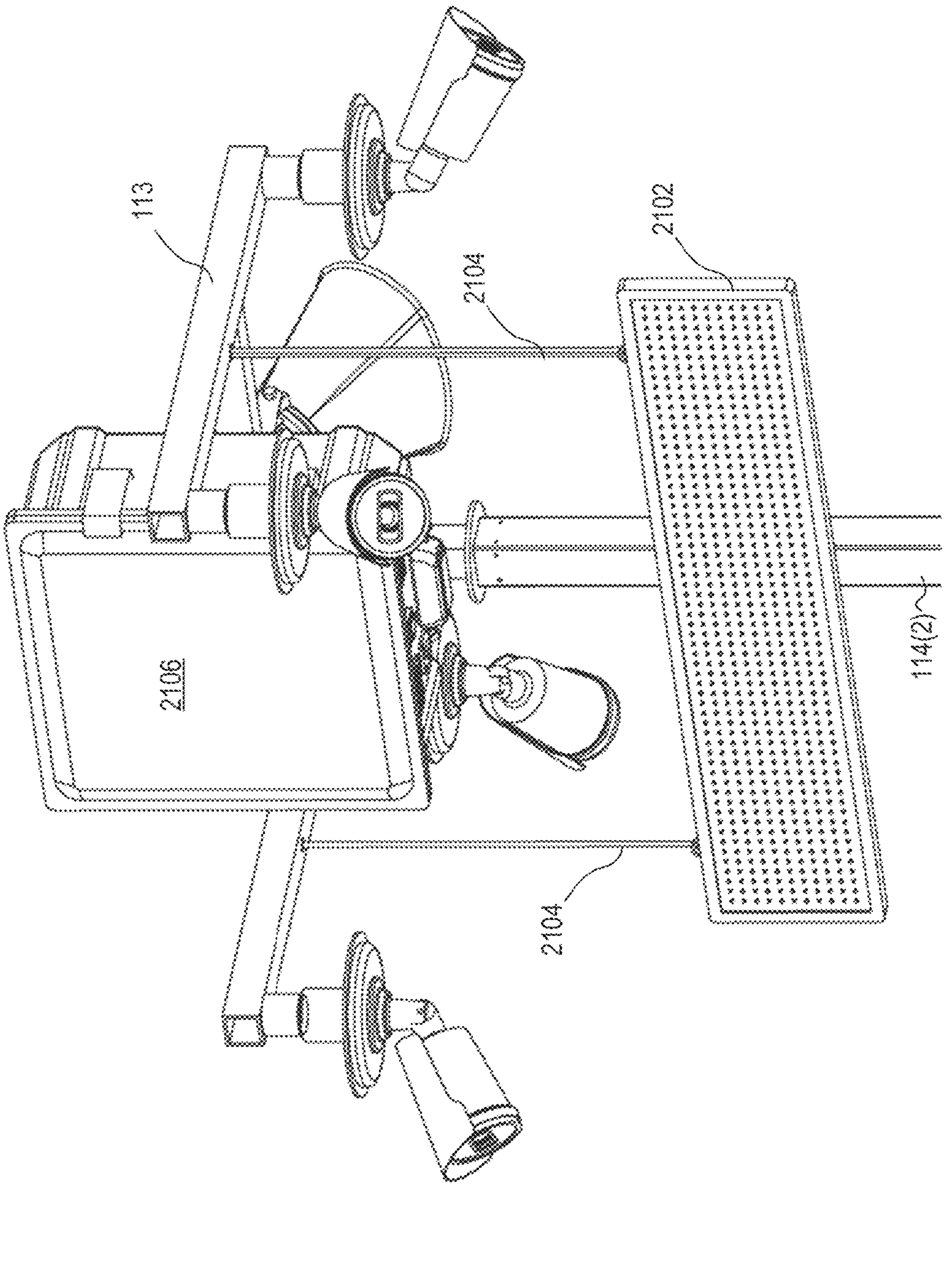
FIG. 21 shows a single panel display mounted to the first device mount, in an embodiment.

FIGS. 19 through 21 show that, although the embodiment of FIGS. 15 and 16 shows each side of the respective display having two display panels therein, there may be more or fewer display panels without departing from the scope hereof. For example, in the embodiment of FIG. 19, there are three display panels 1902(1), 1902(2), and 1902(3) on each side of the display. Each display panel may be mounted in its own display insert support component similar to display insert support component 1610 discussed above. As such, embodiment of FIG. 19 includes all features discussed above with respect to FIG. 16 even if not expressly shown or described herein. FIG. 20 also shows that, although each display panel 1902 (or 1602) is a separate panel, the panels are coordinated such that text or other displayed content may span more than one display.

FIG. 21 shows another embodiment where display may include only a single display, or a single-sided display. Moreover, the display of FIG. 21 establishes that the display need not be directly coupled to mast 128, but may alternatively be mounted at first device platform 113 or second device platform 117. In such configurations, the top of display may have one or more attachment locations 2002 (e.g., fasteners, screws, threaded rods, hooks, loops, connected bars/rods, or other mounting hardware where display can be coupled between the display 2102 and the first device platform 113 or second device platform 117). In the embodiment of FIG. 21, one or both of the attachments 2104 may be a hollow rod/bushing configuration. A power and/or control wiring may be fed through the hollow rod/bushing from control box 2106 so as to power and control the displayed content on display 2102.

As discussed above, electronics housing 122 may include a wireless interface. Similarly, additional display 1502 may include a wireless interface, or may utilize the wireless interface within electronics housing 122 to communicate with an external server 1504, and/or a user device 1506 used by a user 1508. External server 1504 may include its own communication interface 1510, which may be wired or wireless, for receiving transmissions from, and transmitting transmissions to portable solar power device 100 and/or user device 1506.

External server 1504 may include a management module 1512, configured as machine readable instructions that, when executed by a processor 1514 operate to implement the following functionality. Management module 1512 operates to generate a display configuration 1516, and transmit said display configuration 1516 to additional display 1502 via its own communication interface 1510 and associated wireless interface of additional display 1502. Display configuration 1516 operates to control an image, text, or other information displayed on one or more of the plurality of display panels 1602.

Display configuration 1516 may be a static display configuration display configuration 1516 in that it controls the plurality of display panels 1602 to display the same content 1518 according to one or more pre-defined constraints, such as time of day, location, etc. A static display configuration includes capability of multiple pieces of content.

Display configuration 1516 may be dynamic in that it controls plurality of display panels 1602 to change the content 1518 displayed on plurality of display panels 1602 based on one or more conditions 1520 capable of being sensed using one or more sensors (e.g., components of electronic device 112) on portable solar power device 100. The conditions 1520 may include motion detected, personnel detected, light detected, speed detected (e.g., radar), event detection (e.g., gun detection, etc.), audio detection, or other event detection capable of being sensed by a sensor. As such, it should be appreciated that electronic device 112 may include any sensor capable of detecting an event, including audio sensors, LIDAR, cameras, and associated circuitry necessary for analyzing the sensed data and detecting an event represented within the sensed data.

In one embodiment, user 1508 may be an administrator of portable solar power device 100. In such instances, user 1508 may interact with user device 1506 to access external server 1504 (e.g., via a URL and by entering necessary credentials) and define the display configuration 1516. For example, user 1508 may define certain types of content 1518 to display in response to certain types of conditions 1520 (e.g., detected events).

In one embodiment, management module 1512 may implement an artificial intelligence module capable of automatically identifying content 1518 to be displayed. In such instances, the content 1518 may be automatically updated in real-time. Accordingly, portable solar power device 100 may transmit sensed data 1522 using electronic device 112 to external server 1504 for analysis thereby. In response to one or more conditions 1520 within the received sensed data 1522, external server 1504 may transmit an update to content 1518 to be displayed on plurality of display panels 1602.

A benefit of having external server 1504 control the content 1518 displayed at the portable solar power device 100 in real time is that the portable solar power device 100 may be updated based on non-sensed information. For example, in one embodiment, external server 1504 is in communication with a third-party notification server 1524, such as a weather, police or other emergency server. Broadcasts 1526 transmitted by, and received at, external server 1504 may include information relevant to a location of the portable solar power device 100. External server 1504 may monitor the location of portable solar power device 100. For example, portable solar power device 100 may include a GPS, or other location service, such as cellular triangulation device, etc. and transmit its current location to management module 1512 for storage as display information 1528. When broadcast 1526 includes information regarding an event within a certain geofence around the location defined within display information 1528, management module 1512 may update content 1518 and thereby display pertinent information relevant to the broadcast 1526. As one example, portable solar power device 100 are often used at high-crowd events. Broadcast 1526 may include weather information. If a weather event is to occur, and is of a certain severity, content 1518 may be updated to display said weather information (or relevant information related thereto) and indicate to the crowd or event goers to take appropriate measures. As another example, broadcast 1526 may include active shooter information related to an ongoing active event nearby portable solar power device 100. In such instances, content 1518 may be updated to control plurality of display panels 1602 to display information and action advice (e.g., "Take cover") to persons nearby portable solar power device 100.

Figure 18:
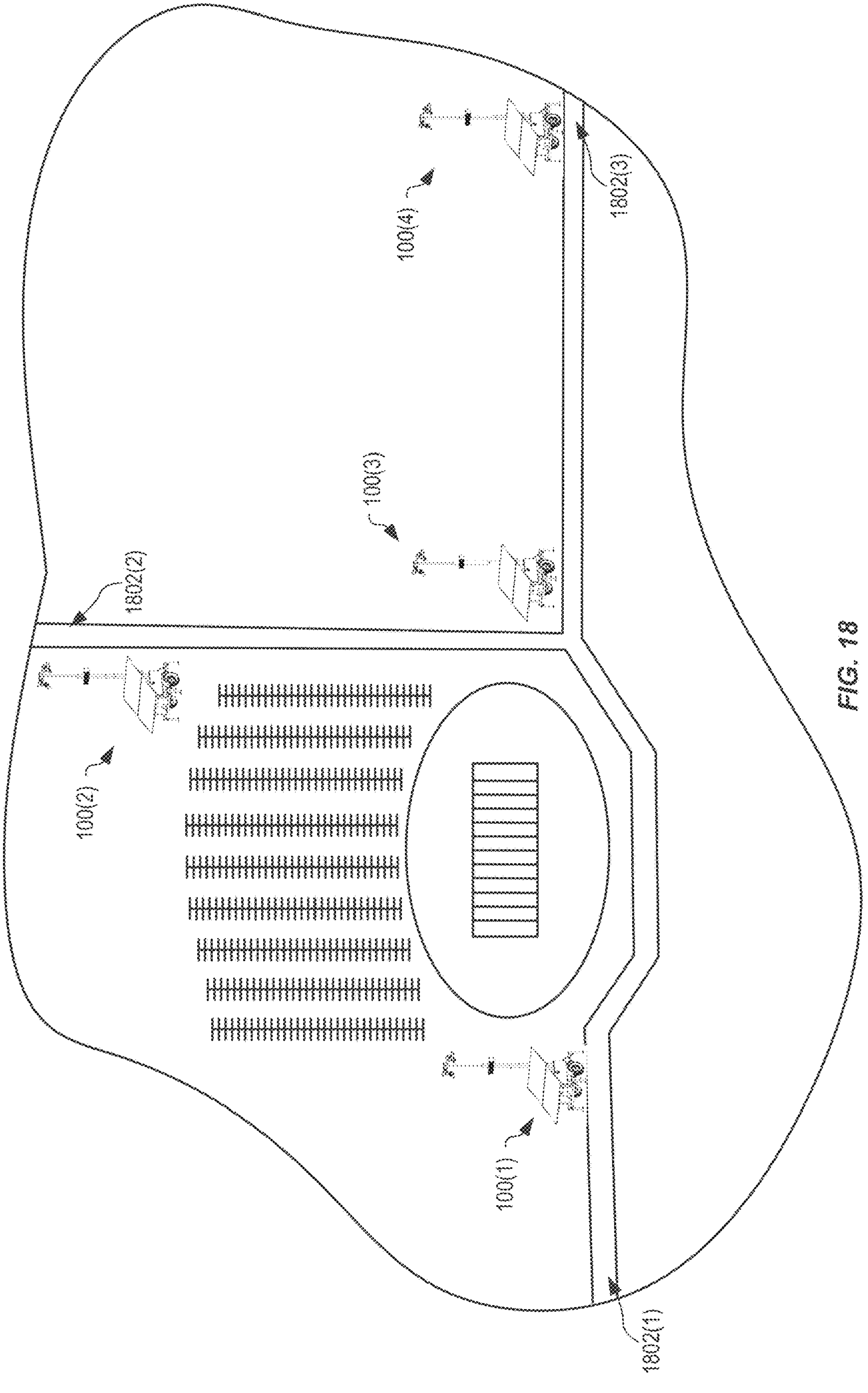
FIG. 18 shows an example coordination between four portable solar power devices with additional display, in an embodiment.

Another benefit of having external server 1504 control content 1518 displayed at portable solar power device 100 is that multiple portable solar power device 100 within a given area may be coordinated. FIG. 18 shows an example coordination between four portable solar power devices, in an embodiment. Each portable solar power device 100 is shown within a stadium configuration and used to direct traffic therein. Each portable solar power device 100 may transmit sensor data 1522 as discussed above (e.g., image data captured by a camera). The sensed data 1522 may be processed by 1504 to identify traffic flow characteristics at each of a plurality of exits 1802(1), 1802(2), 1802(3). For example, where traffic is backed up at exit 1802(2), content 1518 associated with portable solar power device 100(3) may be updated to switch traffic arrows and associated information from directing traffic to use exit 1802(2) to instead using exit 1802(3). As another example, each plurality of display panels 1602 may be controlled to direct traffic towards a given parking spot or area before an event, and after the event switch to direct traffic towards a given exit or plurality of exits (which may be statically determined, or dynamically determined using sensed data 1522 discussed above).

Accordingly, management module 1512 may utilized sensed data 1522 from a first portable solar power device 100 (or a plurality of first portable solar power devices 100) to control content 1518 to be displayed on a second portable solar power device 100 (or a plurality of second portable solar power devices 100). The determination of which second portable solar power device(s) 100 receive which content 1518 may be determined by management module 1512 according to the location of each portable solar power device 100 as defined in display information 1528.

Additionally, display information 1528 may provide accessible information to user 1508. For example, user 1508 may interact with user device 1506 to scan additional display 1502 or portable solar power device 100. For example, 1506 may scan a QR code, barcode, or other identifier displayed on plurality of display panels 1602 or otherwise located on shroud 1616 or any other component of portable solar power device 100. In response to scanning the additional display 1502 or portable solar power device 100, user device 1506 may access a URL hosted by external server 1504 and obtain information about said display. Said obtained information may include location information as defined by display information 1528, or other information related to content 1518 as currently displayed on the plurality of display panels 1602.

Features described above, as well as those claimed below, may be combined in various ways without departing from the scope hereof. The following enumerated examples illustrate some possible, non-limiting combinations.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

We claim:

1. A portable solar panel device, comprising:

a trailer frame;

a device mast coupled to the trailer frame, the mast including a first sub-mast coupled to the trailer frame and a second sub-mast extendably coupled with the first sub-mast;

an electronic device mounted at a first device platform coupled to the second sub-mast;

a second electronic device coupled to the second sub-mast, the second electronic device including:

a bracket secured to the device mast, a display insert component coupled to the bracket, a display panel of a display secured to the display insert component, and a shroud securing over the bracket to form an outer housing of the display and sized and shaped to surround the device mast;

a solar panel array coupled to a solar-panel-array (SPA) mast, the solar panel array including a first sub-panel and a second sub-panel, at least one of the first and the second sub-panel being hingedly coupled to the SPA mast;

a rotation mechanism coupled with the SPA mast including a rotation stop and a rotation limiter such that the SPA mast can rotate with respect to the trailer frame; and an actuator for pneumatically or electronically controlling the solar panel array between an extended position and a retracted position.

2. The portable solar panel device of claim 1, the second electronic device coupled to the first device platform.

3. The portable solar panel device of claim 1, the second electronic device coupled to a second device platform coupled to the second sub-mast.

4. The portable solar panel device of claim 3, the first device platform coupled to a top edge of the second sub-mast.

5. The portable solar panel device of claim 4, the second device platform located below the first device platform on the device mast.

6. The portable solar panel device of claim 5, the second device platform located on a third sub-mast of the device mast, the third sub-mast located between the first sub-mast and the second sub-mast.

7. The portable solar panel device of claim 1, the second electronic device including one or more lights.

8. The portable solar panel device of claim 1, the display insert component comprising a first display insert component and a second display insert component;

the bracket comprising:

a first base component coupled to a corresponding first post component extending therefrom, the first display insert component secured to the first post component, and a second base component coupled to a corresponding second post component extending therefrom, the second display insert component secured to the second post component, wherein the first base component is secured to the second base component via at least two bolts.

9. The portable solar panel device of claim 8, each of the bolts are located such that they do not insert within the mast.

10. The portable solar panel device of claim 1, the shroud comprising a first shroud component and a second shroud component, at least one of the first shroud component and the second shroud component defining a notch such that the device mast passes through the shroud within the notch.

11. The portable solar panel device of claim 1, the display capable of displaying text and the electronic device including a speaker; wherein audio emitted from the speaker is synchronized with the displayed text.

12. A portable solar panel device, comprising:

a trailer frame;

a device mast coupled to the trailer frame, the mast including a first sub-mast coupled to the trailer frame and a second sub-mast extendably coupled with the first sub-mast;

an electronic display coupled to the second sub-mast the electronic display comprising:

a bracket secured to the device mast, a display insert component coupled to the bracket, a display panel secured to the display insert component, and a shroud securing over the bracket to form an outer housing of the electronic display and sized and shaped to surround the device mast;

a solar panel array coupled to a solar-panel-array (SPA) mast, the solar panel array including a first sub-panel and a second sub-panel, at least one of the first and the second sub-panel being hingedly coupled to the SPA mast; and an actuator for pneumatically or electronically controlling the solar panel array between an extended position and a retracted position.

13. The portable solar panel of claim 12, further comprising a display mounted to one or both of a first device platform coupled to the device mast, or a second device platform coupled to the device mast below the first device platform.

14. The portable solar panel device of claim 12, a rotation mechanism coupled with the SPA mast including a rotation stop and a rotation limiter such that the SPA mast can rotate with respect to the trailer frame.

15. The portable solar panel device of claim 12, the display insert component comprising a first display insert component and a second display insert component;

the bracket comprising:

a first base component coupled to a corresponding first post component extending therefrom, the first display insert component secured to the first post component, and a second base component coupled to a corresponding second post component extending therefrom, the second display insert component secured to the second post component, wherein the first base component is secured to the second base component via at least two bolts.

16. The portable solar panel device of claim 15, each of the bolts are located such that they do not insert within the mast.

17. The portable solar panel device of claim 12, the shroud comprising a first shroud component and a second shroud component, at least one of the first shroud component and the second shroud component defining a notch such that the device mast passes through the shroud within the notch.

18. The portable solar panel device of claim 12, further comprising a controller for controlling the display in a dynamic display configuration; wherein, in the dynamic display configuration, content displayed on the display is changeable based on one or more conditions identified within sensed data from at least one sensor on the portable solar panel device.

* * * * *